United States Patent [19]

Troester

[11] Patent Number: 5,013,508
[45] Date of Patent: May 7, 1991

[54] METHOD FOR PRODUCING ELASTOMER SKINS AS LINING MATERIAL FOR PLASTIC MOLDED ARTICLES SUCH AS AUTOMOBILE DASHBOARDS

[75] Inventor: Guenther Troester, Tannenweg 6, Breitenguessbach, Fed. Rep. of Germany, 8613

[73] Assignee: Guenther Troester, Breitenguessbach, Fed. Rep. of Germany

[21] Appl. No.: 351,126

[22] Filed: May 12, 1989

[30] Foreign Application Priority Data

May 14, 1988 [DE] Fed. Rep. of Germany ....... 3816553
Apr. 21, 1989 [DE] Fed. Rep. of Germany ....... 3913157

[51] Int. Cl.⁵ .............................................. B25C 41/08
[52] U.S. Cl. .................... 264/224; 264/46.6; 264/255; 264/309
[58] Field of Search ............... 264/224, 255, 309, 250, 264/254, 267, 46.6

[56] References Cited

U.S. PATENT DOCUMENTS

| | | | |
|---|---|---|---|
| 2,453,604 | 11/1948 | Tenenbaum et al. | 264/224 |
| 3,105,062 | 9/1963 | Graham et al. | 264/309 |
| 3,440,086 | 4/1969 | Kerns | 264/309 |
| 3,872,199 | 3/1975 | Ottinger | 269/309 |
| 4,389,454 | 6/1983 | Horacek et al. | 264/255 |
| 4,668,535 | 5/1987 | Liggett et al. | 264/255 |
| 4,726,110 | 2/1988 | Curtze | 427/282 |
| 4,766,025 | 8/1988 | Sanok et al. | 264/255 |
| 4,822,549 | 4/1989 | Verwilst et al. | 264/257 |
| 4,860,815 | 8/1989 | Parker et al. | 264/227 |

FOREIGN PATENT DOCUMENTS 3110303 10/1982 Fed. Rep. of Germany ...... 264/255

Primary Examiner—Robert A. Dawson
Assistant Examiner—Allan R. Kuhns
Attorney, Agent, or Firm—Fleit, Jacobson, Cohn, Price, Holman & Stern

[57] ABSTRACT

A method for producing elastomer skins as lining material for plastic molded articles, such as automobile dashboards, in which a parting agent and a polyurethane system are introduced into a preform (3) taken from a working model (1) forming a manipulable, dimensionally stable elastomer skin (8), which is unmolded after completion of the reaction and finished in a final mold (11) to make a molded article for improving the process of in-mold coating such that UV-resistant elastomer skins are produced easily and absolutely dimensionally accurately, even with undercuts and narrow, deep crevices. A polyurethane paint is provided between the parting agent and the polyurethane system. Prior to the introduction of the polyurethane layer, the preform (3) is at least regionally inverted into a position in which its side facing the spraying tool (2a) is on the outside and has a substantially convex curvature. A polyurethane layer is applied onto the inverted preform (3) by spraying tool (2a) to produce the unmolded elastomer skin (8) which is then turned right-side out prior to final processing in a final mold (11).

21 Claims, 1 Drawing Sheet

METHOD FOR PRODUCING ELASTOMER SKINS AS LINING MATERIAL FOR PLASTIC MOLDED ARTICLES SUCH AS AUTOMOBILE DASHBOARDS

FIELD OF THE INVENTION

The invention relates to a method for producing elastomer skins as lining material for plastic molded articles, such as automobile dashboards, in which a parting agent, first, and then a polyurethane system are introduced into a preform peeled from a working model. Cross-linking promoting and cross-linking acting agents are added to the system in order to form a manipulable, elastomer skin which is dimensionally stable, even when stored for extended period of time. Once the reaction has taken place, the elastomer skin is unmolded and finished into a molded article in a final mold.

BACKGROUND OF THE INVENTION

Elastomer skins of this type used as lining material for plastic molded articles are especially important in the interior linings of automobiles. Accordingly, their production will be described below with reference to this particular application, but is not limited to it; other possible applications are covers for hospital beds, sheathing of soft foams, particularly for use in the upholstery industry, and so forth.

Since at present a considerable proportion of leisure and/or working time is spent in the car, there is a need for making the interior of automobiles as comfortable as possible. This means that the surface of the interior lining, especially where it is in view or accessible, or in other words on the dashboard, center console, glove compartment lid, on the linings of the posts, the steering wheel cover, and so forth should have a good appearance and a pleasant feel (or "soft touch"). This pleasant feel or soft touch depends on the particular plastics selected, while a good appearance often requires quite complex molding of the elastomer skins.

In a known method for producing liner skins for molded plastic articles, deep-drawn plastic films are used, the patterns for which are first heated and then applied to a matrix by means of a vacuum, and finally by spraying cold water are cooled down until they are dimensionally stable. However, this known method has some disadvantages. For instance, the deep drawing may result in areas of variable thickness, sometimes extending as far as the apparent yielding limit, and in the cooling process, mechanical strains are frozen into them; these areas are weak, where the liner skins tear preferentially, particularly when the frozen-in strains thaw out. To improve the deep-drawability or extend the yielding limit in such films, the proportion of plasticizer is increased; the resultant plasticizer evaporation under the influence of heat leads to fogging of the windshield. Other disadvantages of the skins produced by this method are high contraction, an unfavorable feel and severely limited design options (decorative seams and a leather look are impossible, and light colors are hardly possible).

To overcome these deficiencies at least in part, the so-called slush methods have been developed, in which in an electroforming mold heated to approximately 220° to 240° C., polyvinyl chloride and plasticizer mixtures are first sintered, then the excess is poured off or aspirated away, and finally the mixture is hardened in the mold and cooled down to approximately 60° C.; both liquid systems (liquid slush) with a high proportion of monomeric plasticizer and powder systems (powder slush) with a polymeric plasticizer component are possible. The temperature resistance and design options are improved with skins produced in this way. However, contraction and the limitation on the use of light colors (danger of yellowing or even decomposition) remain; other disadvantages are the emission of hydrogen chloride in the event of fire, and the great expense for molds and manufacturing equipment, which is unfavorable particularly for producing small quantities.

Finally, to produce polyurethane molded articles for automobile building, the so-called in-mold coating technique is used, the most frequently used variant of which is the in-mold coating outlined above, as disclosed for instance from published PCT application WO 87/00482, corresponding to U.S. Pat. No. 4,822,549. In this known method, after the preform, made of a flexible material, is removed from the original model and before the parting agent and the polyurethane system are introduced, it is "laid out". That is, it is deformed by being bent in such a way that every area on its inside, and especially deep protrusions of small inside cross section, are accessible to the jet sprayed by the spraying tool. Only then are the parting agent and the polyurethane system, forming a single layer, introduced into the preform; once the reaction is completed, the single-layer elastomer skin is unmolded and placed in the final mold, which is equivalent to the preform before it was "laid out". The final processing to make the molded article then takes place in this final mold.

The elastomer skins produced by this known method prove to undergo little contraction. Other advantages are the freedom in selecting the surface structure, a good feel because of a good degree of softness of the surface, and the lack of mechanical strains. However, this method still has disadvantages. A particularly unfavorable one has proved to be that the single-layer elastomer skins produced with it are not UV-resistant in extreme climatic conditions, and that undercuts and deep narrow fissures continue to present problems, because accumulations of the polyurethane occur in these regions, which after the final processing of the elastomer skin to make the molded article appear on the surface as protruding raised areas. There are also limits to the "laying out"; in the form shown in the published PCT application WO 87/00482, the face ends - not shown in the drawing—of the preform, for instance, prevent their being bent downward or unfolded from their long sides in the vicinity of the face ends, so that the two deep crevices there do not gape open but instead remain restricted and tight and thus inaccessible to the spraying tool.

OBJECT AND SUMMARY OF THE INVENTION

It is the object of the invention to improve the process of in-mold coating or in-mold painting in such a way that UV-resistant elastomer skins can be produced without difficulty and to absolutely accurate dimensions, even with undercuts and narrow, deep crevices, and in particular without accumulations of material at the base of such undercuts and crevices. The invention accomplishes this by providing a polyurethane paint between the parting agent and the polyurethane system; before the layers are introduced, the preform is moved, by at least regional inversion, i.e. turned inside out into a position in which its side previously facing a preform mold is facing outwardly and oriented toward the spraying tool has a substantially convex curvature, and the unmolded elastomer skin after being formed is turned inside out prior to its final processing in the final mold.

The provision of an additional layer of polyurethane paint has several advantages. First, this additional layer assures the UV resistance of the elastomer skin even under extreme climatic conditions. Although other paints may be used, nevertheless polyurethane paints are very environmentally acceptable and, by chemical reaction they form an inseparable bond with the polyurethane system layer. In an application in which UV resistance is not important, other properties of the paint layer (such as elongation to tear) can be optimized. Moreover, the surface property of the elastomer skin provided with this kind of paint layer is better than that of the known single-layer elastomer skins, because the fluid polyurethane lacquer paint, applied very thinly, forms a closed, pore-free film in the preform, which covers the pores of the polyurethane system layer located behind it. In this connection it should also be noted that if the polyurethane system layer is very thick, and/or in the case of curvatures having very short radii, overstretching the elastomer skin causes scars or even cracks in the polyurethane system layer; in the absence of a covering paint layer, these scars or cracks would become dirty and continue to tear to the point of complete separation. Finally, the paint layer assures that the strains arising when the preform is inverted and when the unmolded elastomer skin is turned inside out again will not cause any damage; the inherent elasticity of the paint layer absorbs these strains.

Turning the preform inside out into a position in which its side oriented toward the spraying tool has a substantially convex curvature creates a consistently good accessibility of the spraying tool to all the areas of the preform, including the undercut or deeply dished areas, so that a thoroughly uniform application of both the paint layer and the polyurethane system layer is possible. Moreover, this provision of the method has still other advantages. For instance, by a regional covering of the sides of the preform oriented toward the spraying tool by means of masks, a multicolor elastomer skin can be attained. It is also possible for the elastomer skin, turned inside out after the unmolding, to be coated once again in a locally defined manner and thus to counteract any tendency to resuming its original shape (memory effect).

In a further feature of the invention, the multi-layer structure of polyurethane paint and polyurethane system of the elastomer skin is selected for the preform as well, which represents a negative elastomer skin. This preform is made on the working model by using spraying robots to apply it with a uniformly constant layer thickness; process tolerances arising in the course of the later inversion can be taken into account. This preform is used by securing it to a permanent support mold. The preform is a disposable product; when the textured surface wears down it can immediately be replaced by a new negative elastomer skin peeled from the working model and therefore having a virgin surface. Changes in the textured surface can therefore be made quickly and at favorable cost by comparison with electroforming. By dimensionally accurate application in terms of thickness of the preform and elastomer skin, a constantly uniform fit in the later back-filling process is assured. Naturally, the preform mold may instead be of rubber, silicon, synthetic resin or metal (electroforming mold), but that is substantially more expensive than the proposal according to the invention.

It has proved to be advantageous to perform the inversion of the preform only in regions that have no radii of less than 4 mm, and in regions having radii less than 4 mm to begin the inversion of the preform after the end of the radius line.

In accordance with a further feature of the invention, the process tolerances arising in the inversion of the preform are compensated for in the working model, the compensation suitably being effected by manual machining, CAD/CAM processes or digitizing of the applicable regions of the original model. The manual machining may be performed in the corner regions, similarly to what is done with deep-drawing dies; with digitizing, a percentage-wise correction in three different axes is possible, for instance with a Fidia control.

For plastic molded articles that are applied to the outside of an automobile and exposed to the weather, it has proved to be favorable to introduce between the parting agent and the polyurethane paint a colorless, light-fast, impact- and chemical-resistant primary layer comprising an aliphatic two-component polyurethane system. Especially if the polyurethane paint is embodied as a metallic paint, then this method provision is recommended to provide corrosion protection for the metallic component.

The parting agent can be dispensed with in a further feature of the invention, which provides the use of a self-parting paint as the polyurethane paint.

BRIEF DESCRIPTION OF THE DRAWING

The invention will now be described in detail with reference to the accompanying drawing, in highly simplified form, which shows the method according to the invention by way of example and wherein.

DESCRIPTION OF THE PREFERRED EMBODIMENT

Figure 1:
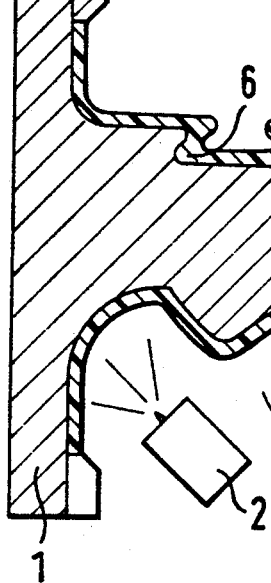
FIG. 1 is a cross-sectional view showing a preform made in accordance with the invention.

In FIG. 1, a working model 1 is shown, on which a preform 3, which represents a negative elastomer skin, has been formed by means of a spraying robot 2. Reference numeral 4 indicates those regions of the preform 3 about which the shanks of the preform are pivoted when the preform is inverted, or turned inside out, in the direction of the arrows 5a and 5b.

Figure 2:
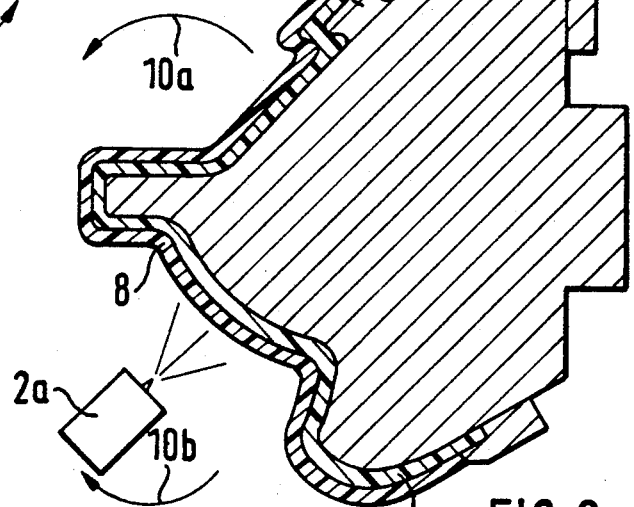
FIG. 2 is a view similar to FIG. 1 showing the preform after inversion.

FIG. 2 shows the preform 3 after the inversion. In this position, the side of the preform 3 oriented, or facing, toward the working model 1 in FIG. 1 has been turned "inside out", but the two regions 6 and 7 having radii of less than 4 mm have been left unchanged; this side of the preform 3 now faces outwardly toward the spraying robot 2a, and can be seen to have a substantially convex curvature on the side facing outwardly, facing i.e., the robot, that is readily accessible throughout. By means of the spraying robot 2a, a uniform polyurethane layer structure 8 is formed on the preform 3, which is reinforced on the back with a dimensionally stable substrate 9; this substrate 9, forming a permanent support mold, is heated in order to accelerate the reaction process. Once the reaction is completed, the polyurethane layer structure 8 has become the elastomer skin.

Figure 3:
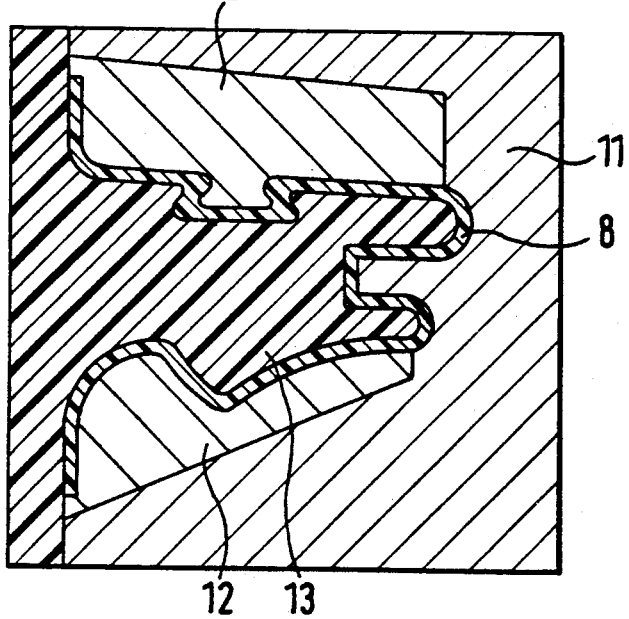
FIG. 3 is a view similar to FIG. 1 showing the final mold step.

Because of its intrinsic elasticity, this elastomer skin 8 can readily be unmolded or in other words removed from the substrate 9 and preform 3, and then inverted, or turned inside out, in the direction of the arrows 10a and 10b. After the elastomer skin 8 has been turned inside out again, it has a shape precisely equivalent to the final mold 11 in FIG. 3. In FIG. 3, the right-side-out elastomer skin 8 is shown placed in the final mold 11, which together with the pushers or loose parts 12 has been taken directly or indirectly from the original model. In this final mold 11, the elastomer skin 8 is back-filled on its inside by the introduction of material 13 and finished to make the final molded article.

I claim:

1. A method for producing elastomer skins as lining for plastic molded articles, such as automobile dashboards, comprising:
   providing a working model;
   applying a layer of elastomer material onto said working model to form a preform having an inner side facing said working model and an outer side facing away from said working model;
   removing said preform from said working model;
   inverting said preform in at least certain regions thereof by turning said preform substantially inside out so that said inner side of the preform previously facing said working model is on the outside of said preform and said outer side is on the inside thereof;
   applying a polyurethane paint onto said outside of said inverted preform;
   providing at least one spraying tool at said outside of said preform in said inverted position;
   applying at least one polyurethane layer by said at least one spraying tool onto said outside of said inverted preform to form a manipulable elastomer skin having the shape of said inverted preform;
   removing said elastomer skin together with said layer of polyurethane paint integral therewith from said preform; and
   inverting said elastomer skin by turning said elastomer skin inside out so that the side thereof originally facing said preform and having said integral layer of polyurethane paint thereon is on the outside of said elastomer skin.

2. The method as claimed in claim 1 and further comprising:
   applying a parting agent onto said outside of said inverted preform prior to applying said at least one polyurethane layer.

3. The method as claimed in claim 1 wherein:
   said step of applying at least one polyurethane layer comprises applying cross-linking promoting and cross-linking agents onto said outside of said inverted preform.

4. A method as claimed in claim 1 wherein said final processing comprises:
   providing a final mold;
   placing said elastomer skin in said final mold; and
   backfilling the inside of said elastomer skin.

5. A method as claimed in claim 3 wherein said final processing comprises:
   providing a final mold;
   placing said elastomer skin in said final mold; and
   backfilling the inside of said elastomer skin.

6. A method as claimed in claim 1 and further comprising:
   forming said preform by said process for forming said elastomer skin so that said preform represents a negative elastomer skin.

7. A method as claimed in claim 1, wherein:
   said inverting of the preform comprises bending said preform only in regions thereof that do not have radii less than 4 mm.

8. A method as claimed in claim 7, wherein:
   in regions of said preform having radii of less than 4 mm and radius line ends, said bending of said preform regions begins substantially at the radius line ends.

9. A method as claimed in claim 1 and further comprising:
   compensating for process tolerances created by said inverting of the preform in said working model.

10. A method as claimed in claim 9 wherein:
    said compensating comprises manual machining of applicable partial regions of the working model.

11. A method as claimed in claim 2 and further comprising:
    between the steps of applying said parting agent and said polyurethane paint, applying a colorless, lightfast, impact and chemical-proof primary layer comprising an aliphatic two-component polyurethane system.

12. A method as claimed in claim 1 wherein:
    said polyurethane paint comprises a self-parting paint.

13. A method as claimed in claim 6 wherein:
    said inverting of the preform comprises bending said preform only in regions thereof that do not have radii less than 4 mm.

14. A method as claimed in claim 13 wherein:
    in regions of said preform having radii of less than 4 mm and radius line ends, said bending of said preform regions begins substantially at the radius line ends.

15. A method as claimed in claim 14 and further comprising:
    compensating for process tolerances created by said inverting of the preform in said working model.

16. A method as claimed in claim 9, wherein:
    said compensating comprises CAD/CAM of applicable partial regions of the working model.

17. A method as claimed in claim 9 wherein:
    said compensating comprises digitizing of applicable partial regions of the working model.

18. A method as claimed in claim 15 wherein:
    said compensating comprises manual machining of applicable partial regions of the working model.

19. A method as claimed in claim 5 and further comprising:
    between the steps of applying said parting agent and said polyurethane paint, applying to said outside of said inverted preform a colorless, lightfast impact and chemical-proof primary layer comprising an aliphatic two-component polyurethane system.

20. A method as claimed in claim 19 wherein:
    said polyurethane paint comprises a self-parting paint.

21. A method as claimed in claim 1 and further comprising:
    providing a final mold;
    placing said elastomer skin in said final mold; and
    backfilling the inside of said elastomer skin.

* * * * *